United States Patent
Fabre

(10) Patent No.: US 11,353,916 B2
(45) Date of Patent: Jun. 7, 2022

(54) CLOCK-ERROR ESTIMATION FOR TWO-CLOCK ELECTRONIC DEVICE

(71) Applicant: Be Spoon SAS, Le Bourget du Lac (FR)

(72) Inventor: Pascal Fabre, Chambery (FR)

(73) Assignee: BE SPOON SAS, Le Bourget du Lac (FR)

( * ) Notice: Subject to any disclaimer, the term of this patent is extended or adjusted under 35 U.S.C. 154(b) by 0 days.

(21) Appl. No.: 17/177,587

(22) Filed: Feb. 17, 2021

(65) Prior Publication Data
US 2021/0255660 A1   Aug. 19, 2021

(30) Foreign Application Priority Data

Feb. 17, 2020  (EP) ..................................... 20305147

(51) Int. Cl.
| | |
|---|---|
| *G06F 1/12* | (2006.01) |
| *G06F 1/08* | (2006.01) |
| *G06F 1/14* | (2006.01) |
| *G06F 11/16* | (2006.01) |

(52) U.S. Cl.
CPC ................. *G06F 1/08* (2013.01); *G06F 1/12* (2013.01); *G06F 1/14* (2013.01); *G06F 11/1679* (2013.01)

(58) Field of Classification Search
CPC ....................................................... G06F 1/10
See application file for complete search history.

(56) References Cited

U.S. PATENT DOCUMENTS

| | | | | |
|---|---|---|---|---|
| 5,828,248 | A * | 10/1998 | Masuda ................. | G04G 3/022 377/25 |
| 5,874,846 | A | 2/1999 | Lee | |
| 5,905,391 | A * | 5/1999 | Mooney ................. | H03K 5/135 713/401 |
| 6,225,840 | B1 * | 5/2001 | Ishimi ...................... | G06F 1/04 327/159 |
| 6,539,489 | B1 * | 3/2003 | Reinert ..................... | G06F 1/14 713/400 |
| 7,492,316 | B1 | 2/2009 | Ameti et al. | |
| 10,069,508 | B1 * | 9/2018 | Zhang .................... | H03M 1/662 |
| 2004/0141526 | A1 * | 7/2004 | Balasubramanian . | H04J 3/0667 370/503 |
| 2006/0056560 | A1 * | 3/2006 | Aweya ................... | H04J 3/0664 375/356 |
| 2007/0105525 | A1 * | 5/2007 | Wang .................... | H04W 52/029 455/343.1 |
| 2007/0260906 | A1 * | 11/2007 | Corredoura ............... | G06F 1/12 713/400 |
| 2009/0147899 | A1 | 6/2009 | Arviv et al. | |
| 2010/0001769 | A1 * | 1/2010 | Brantley ............... | H03L 7/0818 327/144 |

(Continued)

FOREIGN PATENT DOCUMENTS

EP          0768583 A2    4/1997
WO       2020212723 A1   10/2020

*Primary Examiner* — Phil K Nguyen
(74) *Attorney, Agent, or Firm* — Slater Matsil, LLP

(57) ABSTRACT

An embodiment method is disclosed for deriving an estimation value of a clock-error for a slave clock, wherein the slave clock is set at a nominal slave period and outputs a sequence of slave clock signals at an actual slave period, and wherein a difference between the actual slave period and the nominal slave period is approximated by the estimation value of the clock-error.

20 Claims, 5 Drawing Sheets

(56) References Cited

U.S. PATENT DOCUMENTS

2010/0220748 A1\* 9/2010 Inomata .................... G06F 1/12
370/503
2013/0241774 A1 9/2013 Shin et al.
2020/0285265 A1\* 9/2020 Ranganathan ............ G06F 1/06

\* cited by examiner

FIG 4
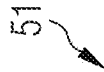

CLOCK-ERROR ESTIMATION FOR TWO-CLOCK ELECTRONIC DEVICE

CROSS-REFERENCE TO RELATED APPLICATIONS

This application claims the benefit of European Patent Application No. 20305147.9, filed on Feb. 17, 2020, which application is hereby incorporated herein by reference.

TECHNICAL FIELD

The present disclosure relates generally to operating a two-clock electronic device and in particular to deriving an estimation of a clock-error for one of the two clocks of the two-clock electronic device. Moreover, the present disclosure relates to implementing such a clock-error estimation into a location system, in particular an Ultra-wideband (UWB) location system based on communicating UWB signals between a mobile tag device and stationary devices. For example, the present disclosure relates to efficiently controlling timing within that UWB communication, in particular with respect to exchanging the sequences of UWB signals within a UWB communication frame.

BACKGROUND

For the concepts disclosed herein, an electronic device includes two clocks that are operating at different frequencies. The clocks are used to provide time information and may be required to be synchronized externally but may also be configured to perform an internal synchronization.

Some systems that use two-clock electronic devices, such as location systems, require a high level of synchronization at specific time intervals, during which they may operate a very high frequency clock. However, during some time intervals, those systems only may use the low power clock to save power.

The importance of accurate timing is in particular given for location systems, such as indoor location systems. Indoor location systems were in particular developed to provide position information for a large number of mobile tag devices (slave devices) and to track the same with an accuracy down to several centimeters or millimeters. For example, in indoor environments, such location systems can be used, for tracking workpieces, worktools, workers, packages, shopping carts etc. An example for a location system that uses high precision with respect to the timing of exchanging signals is a UWB location system that uses UWB signals to measure the distance between components of the UWB location system, specifically the mobile tag devices and stationary devices.

UWB location systems are usually based on well-defined emission time points of the UWB signals and a precise measurement of reception time points. Precise timings of the emission and reception of the UWB signals are required to allow measurements such as time-of-flight (ToF) measurements (also referred to as time-of-arrival (ToA) measurements) or time-difference-of-arrival (TDoA) measurements with a required accuracy. The emission and reception of the UWB signals and the related measurements are repeated at a location rate to further track a movement of the mobile tag device. A location rate frame defines the various slots for emitting and receiving the UWB signals, generally performing the respective activities associated with operating one or both clocks of a two-clock electronic device. As specific slots may be associated to specific devices, sleep mode operation needs to be terminated precisely with respect to the associated slot. Power consumption can be optimized, the closer the wake-up point in time can be moved to the beginning of the associated slot.

SUMMARY

The international patent application PCT/IB2019/000745 filed on Apr. 19, 2019 and the international patent application PCT/FR2019/052514 filed on Oct. 22, 2019 by the applicant discloses exemplary UWB location systems, location protocols, and underlying UWB frame formats defining UWB signals with respect to their content. The entire contents of the international patent applications are incorporated herein by reference. The disclosed exemplary UWB location systems can use the concepts disclosed herein for their two-clock electronic devices such as the master and slave devices. Two-clock electronic devices of UWB location systems include, e.g., master beacon devices, optionally beacon repeater devices, tag devices, and optionally tag response receptor units.

To cope with the requirements indicated above for two-clock electronic devices, it is herein proposed an innovative way of synchronizing two clocks, and in particular of deriving an estimation of the clock-error for a slave clock of the two clocks. The proposed concepts may allow, for example, to alternate power consumption if one needs to operate a device with short periods of time of very high synchronization (and thus increased power consumption) and long periods of time of very low power consumption.

An exemplary aspect of the invention is to identify a clock-error as precisely as possible within a short period of time.

Thus, the present disclosure is directed, at least in part, to improving or overcoming one or more aspects of prior systems.

In a first aspect, the present disclosure is directed to a (computer-implemented) method for deriving an estimation value of a clock-error for slave clocks. The slave clock is set at a nominal slave period and outputs a sequence of slave clock signals at an actual slave period. The difference between the actual slave period and the nominal slave period is approximated by the estimation value of the clock-error. The method includes the steps:

optionally providing a master clock that outputs a sequence of master clock signals at a master period, and the slave clock that outputs a sequence of slave clock signals at an actual slave period;

receiving a sequence of master clock signals (5') at a master period (THCLK) that is output from a master clock (5), and a sequence of slave clock signals (3') at an actual slave period (TLCLK) that is output from the slave clock (3), providing a measurement time period that begins at a starting time point and ends at an ending time point, wherein the measurement time period includes a common multiple time period, the common multiple time period ends at the ending time point and has a length in time that is a first multiple of the nominal slave period and is a second multiple of the master period, providing a sequence of storing time points temporally displaced within the common multiple time period by the actual slave period, the last of the storing time points being the ending time point of the measurement time period, starting to count the slave signals and the master signals at the starting time point, for more than one storing time point, storing a master count value that represents the counted master signals in association with the respective storing time point, deriving an actual master count sum value by adding the stored master count values, deriving, for the more than one storing time points, a nominal master count sum value, and deriving the estimation of the clock-error for the slave clock by relating the actual master count sum value to the nominal count sum value.

In another aspect, a (computer-implemented) method is disclosed for reactivating a two-clock device when operating a location system that uses the two-clock device. The two-clock device includes a slave clock and a master clock, wherein the two-clock device is operatable in a location mode for supporting localization and a sleep mode during which localization is not supported and an operation of the slave clock is maintained. The method includes the steps:

deriving an estimation value of a clock-error for the slave clock of the two-clock device using the method summarized above, while the two-clock device is operated in the location mode, determining a required duration of the sleep mode to be monitored by the slave clock under consideration of the estimation value of the clock-error, activate the sleep mode of the two-clock device, monitoring a slave clock signal of the slave clock to identify an expiration of the required duration of the sleep mode, and re-activating the two-clock device, once the expiration of the required duration of the sleep mode is detected.

In another aspect, a (computer-implemented) method for calibrating a slave clock with respect to a master clock includes the steps:

deriving an estimation value of a clock-error for the slave clock using the method summarized above, and tuning the slave clock based on the estimation value of the clock-error towards the actual slave period.

In another aspect, a method is disclosed for calibrating a slave clock with respect to a master clock. The method includes:

deriving an estimation value of a clock-error for the slave clock using the method summarized above, and tuning the slave clock based on the estimation value of the clock-error towards the actual slave period.

In another aspect, a two-clock device includes a slave clock, in particular a low power consuming low frequency clock, wherein the slave clock is associated with a nominal slave period and is configured to output a sequence of slave clock signals at an actual slave period and wherein the difference between the actual slave period and the nominal slave period can be approximated by an estimation of a clock-error, a master clock, in particular a high precision, high frequency clock, wherein the master clock is configured to output a sequence of master clock signals at a master period, an error estimation electronics for deriving an estimation value of a clock-error for a slave clock includes a processor configured to perform the steps of the above mentioned (herein disclosed) method for deriving an estimation value of a clock-error for slave clocks and optionally configured to perform the steps of the above mentioned (herein disclosed) method for reactivating a two-clock device when operating a location system that uses the two-clock device.

In some embodiments, the error estimation electronics includes data storage having stored therein data defining a measurement time period that begins at a starting time point and ends at an ending time point, wherein the measurement time period includes a common multiple time period, the common multiple time period ending at the ending time point and having a length in time, which is a first multiple of the nominal slave period and is a second multiple of the master period, data defining a sequence of storing time points temporally displaced within the common multiple time period by the actual slave period, a last of the storing time points being the ending time point of the measurement time period, and/or data representing the nominal master count sum value, in particular a value derived by the equation: sum of $[(R-1) \times m + i \times TLCLK\_n/THCLK]$, whereby R is the number of common multiple time period(s) within the measurement time period, m is the number of master clock counts defining the common multiple time period, i is the number of counted ideal slave periods within the last common multiple time period, TLCLK_n is the nominal slave period of the slave clock, and THCLK is the clock period of the master clock, and/or values allowing computation of the nominal master count sum value.

In some embodiments, the two-clock device includes at least one of a localizing electronics, in particular an ultra-wide band localizing electronic setup including signal receiving and emission electronics that is configured to be operated in line with a localizing frame that requires the localizing electronics to perform specific localizing actions during a wake-up period, and a battery for providing power to the slave clock, the master clock, the error estimation electronics, and optionally the localizing electronics.

In some embodiments, the error estimation electronics is configured to execute the steps of:

starting to count the slave signals and the master signals at the starting time point, for more than one storing time point, storing a master count value of the counted master signals in association with the respective storing time point, deriving an actual master count sum value by adding the stored master count values, deriving, for the more than one storing time point, a nominal master count sum value, and deriving the estimation of the clock-error for the slave clock by relating the actual master count value to the nominal count value.

In another aspect, an error estimation electronics for deriving an estimation value of a clock-error for a slave clock includes a processor configured to perform the steps of the above mentioned (herein disclosed) method for deriving an estimation value of a clock-error for slave clocks and optionally configured to perform the steps of the above mentioned (herein disclosed) method for reactivating a two-clock device when operating a location system that uses the two-clock device.

In some embodiments of the methods, the common multiple time period can include a sequence of lowest common multiple time periods and the sequence of storing time points is defined in the last of the plurality of lowest common multiple time periods.

In some embodiments of the methods, the measurement time period can include a plurality of common multiple time periods and the sequence of storing time points is defined in the last of the plurality of common multiple time periods.

In some embodiments of the methods, the master count values can be stored for each of the storing time points or a sub-group of the storing time points, the sub-group including storing time points separated by multiple slave periods, a portion of consecutive storing time points, or randomly selected storing time points.

In some embodiments of the methods, each of the stored master count values can correspond to the master signals counted up to the respective storing time point and optionally includes the master signal following the storing time point.

In some embodiments of the methods, the adding the stored master count values can include adding or subtracting half a count for each of the stored master count values.

In some embodiments of the methods, the deriving the estimation of the clock-error can include subtracting a value 1 for one count from the ratio between the nominal master count value and the actual master count value.

In some embodiments of the methods, each stored master count value can be generated to include the counts for the master clock from the beginning of the measurement time period until a respective slave clock count of a storing time point associated with the stored master count value.

In some embodiments of the methods, the nominal master count sum value can be derived based on the equation: sum of $[(R-1) \times m + i \times TLCLK\_n/THCLK]$, whereby R is the number of common multiple time period(s) within the measurement time period, m is the number of master clock counts defining the common multiple time period, i is the number of counted ideal slave periods within the last common multiple time period, $TLCLK\_n$ is the nominal slave period of the slave clock, and THCLK is the clock period of the master clock. In some embodiments of the methods, the nominal master count sum value (determined as above) can be stored on a data storage and, during and for the error estimation, be read from the data storage. For example, the nominal master count sum value can be based on values derived by the equation: sum of $[(R-1) \times m + i \times TLCLK\_n/THCLK]$, whereby R is the number of common multiple time period(s) within the measurement time period, m is the number of master clock counts defining the common multiple time period, i is the number of counted ideal slave periods within the last common multiple time period, $TLCLK\_n$ is the nominal slave period of the slave clock, and THCLK is the clock period of the master clock, and the values and/or the nominal master count sum value are read from a data storage.

In some embodiments of the methods, the number of storing time points used for storing master counts values is selectable based on a required maximal clock-error and/or an available calculation power.

In some embodiments of the methods, the two-clock device (1) is a mobile tag device (T) that is associated with a time slot (33_6) within a location frame format (33) underlying the location system (201), and a wake-up time (T1) of the tag device (T) is based on the estimation value of the clock-error that is derived for the slave clock (3) of the tag device (T).

Further embodiments of the above aspects, are disclosed in the dependent claims, which are incorporated herein by reference.

The herein proposed procedure to measure a clock-error and thereby a clock-drift between two clocks can be used in various system configurations. The herein in more detail disclosed UWB communication may be a primary application in which two clocks are used, one being operated with a slightly detuned target frequency. Further applications may apply the herein disclosed procedure to measure the clock-error in various types of systems. For example, so-called GSM applications may apply the herein disclosed concepts. Furthermore, the herein disclosed concepts can be used to adjust clocks inside a single device, or between two separate devices.

An advantage of the concepts described herein relates to the essentially significantly increased accuracy of the error determined, when compared to prior art procedures. This advantage allows using less accurate and less energy consuming clocks for timing purposes.

The increased accuracy when determining the error is additionally accompanied by the short time needed for performing the determination.

Generally, for two-clock electronic devices, due to the calibration of the low power clock, the clock-drift can be limited during the sleep period. When the two-clock electronic device wakes up, due to the limited clock-drift, one can optimize a wake-up time and thus the activity period during which a high-power consuming clock is active. Thus, the timing can be improved and it is possible to achieve very quickly a high level of synchronization with the outer world such as a location network synchronization in the case of a location system.

Within UWB systems, this advantage can ensure that the slave device is precisely activated shortly prior to the expect signal to be detected, which is, for example, emitted from a master device. The short time needed for performing the determination further reduces the energy consumption.

In other words, in location systems the determined clock-error can be used to update timing (i.e., remove the clock-error) and to optimize a sleep period, particular for a two-way-ranging-procedure.

In addition, the herein disclosed concepts can be used for determining a clock-error for calibration purposes (fine tuning) of one clock of a two-clock electronic device, e.g., within the UWB system, such as tuning a low frequency clock used within a tag device.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIG. 4 shows two tables with exemplary values for illustrating the calculation;

DETAILED DESCRIPTION OF ILLUSTRATIVE EMBODIMENTS

Figure 1:
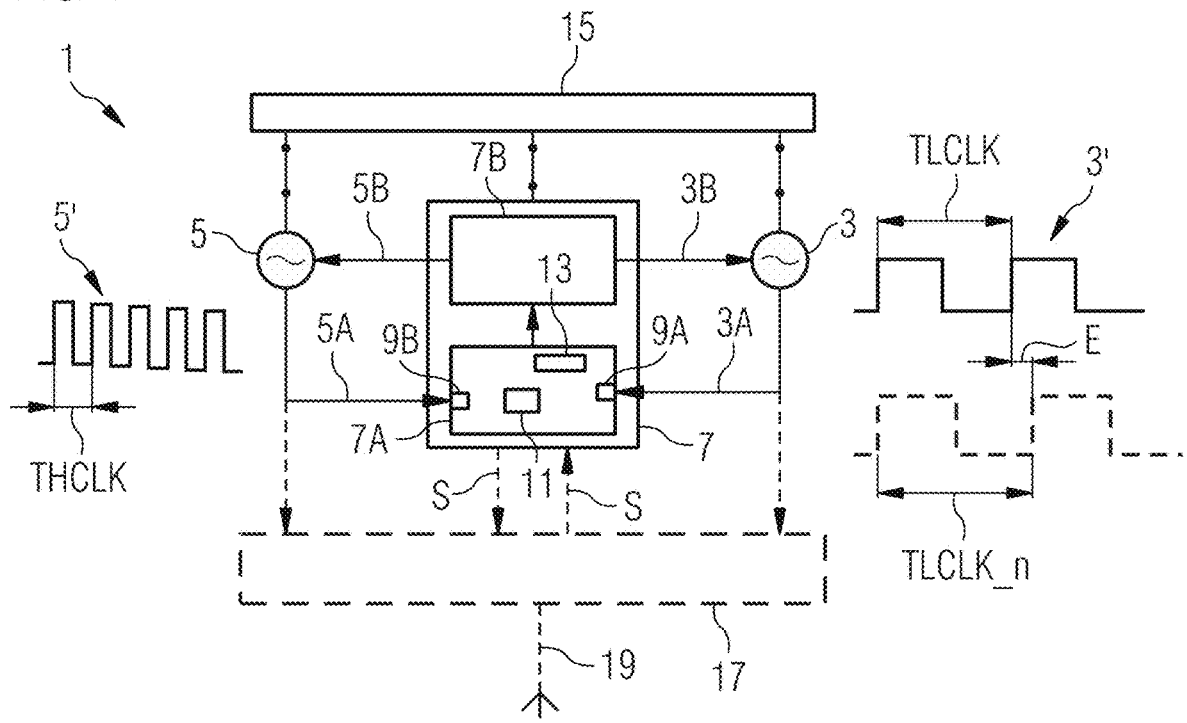
FIG. 1 shows a schematic illustration of an exemplary two-clock electronic device.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection.

Rather, the scope of patent protection shall be defined by the appended claims.

The disclosure is based in part on the realization that a specific measurement time period can improve the estimation of a clock-error. The improvement was realized in particular to be achieved by specific clock counting procedures during that measurement time period. The inventors realized in particular that a preferred measuring time period can be based on a common multiple time period as a base counting period. During the measuring time period, a specific counting approach is used. In addition, the inventors realized that the improvement depends on the included number of stored count values and that the improvements can further be affected by including preceding counting periods.

FIG. 1 illustrates schematically a two-clock electronic device 1 with a slave clock 3 and a master clock 5. Furthermore, device 1 includes an error estimation electronics 7 including a counter and control block 7A and a fine and fast tuning block 7B.

The slave clock 3 and the master clock 5 provide clock signals 3A, 5A to the counter and control block 7A. In FIG. 1, exemplary two clock signals 3', 5' are schematically indicated. Each clock signal is a voltage pulse that form a train of repeating voltage pulses having a long slave (clock time) period TLCLK and a short master (clock time) period THCLK, respectively. The clock signals can be analog/digital signals that allow the counter and control block 7A to count clock signals and compute a clock-error associated with one or both of the clocks. Generally, a clock may develop a clock-error over time as the clock shifts within its accuracy. For example, without correction clock-errors of several to several 100 ppm may occur over a time scale given by the accuracy of the clock. In the present considerations, it is assumed that the short master (clock time) period THCLK is more stable than the slave (clock time) period TLCLK.

As shown in FIG. 1, clocks are associated with respective counters 9A, 9B within the counter and control block 7A. Each counter may be implemented as a counting digital semiconductor device. The counting of the counters 9A, 9B may be controlled by a processor 11 and count values of counted signals may be stored in a data storage 13 and further processed by the processer 11. For example, processor 11 may be configured to run computer routines for calculating an estimation of a clock-error of one of the clocks 3, 5 and provide control signals based thereon, for example, to the fast and fine tuning block 7B and/or some other application.

The fast and fine tuning block 7B is configured to output control signals 3B, 5B to the slave clock 3 and the master clock 5, respectively. Thereby, the slave period TLCLK and the master period THCLK can be set to respective nominal frequencies. Specifically, the output control signals 3B, 5B can control each clock individually to update, e.g., a register value or an analog value to change the center frequency according to the respective application and optionally an estimated clock-error. In FIG. 1, a nominal slave period TLCLK_n is indicated being longer by a clock error E then the actual slave period TLCLK.

The slave clock 3 may be an example for a low power clock providing a low accuracy but having a very low power consumption. A typical example of such a low power clock is a several kHz oscillator. For a 32 kHz oscillator, the low power clock has a slave period of ~30.5 µs (TLCLK=1/slave clock frequency). The power consumption of a low power clock may be, for example, in the µA-range. The low power clock may often be the lower frequency clock that is used as a slave clock and is, for example, operated during sleep times of the two-clock electronic device.

The master clock 5 may be an example for an (high) accuracy clock using a higher frequency crystal oscillator that is, for example, controlled in temperature and in voltage. The accuracy clock may be very accurate, but it may consume a lot of power. A typical example of such an accurate clock is a 26 MHz clock, such as a 26 MHz VcTcXO (voltage controlled and temperature controlled oscillator). For a 26 MHz oscillator, the accuracy power clock has a master period of ~38.5 ns (THCLK=1/master clock frequency). The power consumption of such an accuracy clock may be, for example, 1.5 mA. Due to its higher accuracy, the accuracy clock may be considered a master clock that is used for defining the transmission of master signals, for example.

The two-clock electronic device 1 further has a power supply 15 such as a battery that supplies the slave clock 3 and the master clock 5 as well as the error estimation electronics 7 with electric power.

For operating the two-clock electronic device 1, a user can set a nominal counter value for each of the clocks, a respective frequency for each of the clocks, an expected amount of counted clock values during a measurement time period, the type of used triggering for counting the clock signals such as rising or falling edges, both edges.

In the data storage 13, information on various aspects of the operation of the two-clock electronic device 1 can be stored, such as control curves and data on the implementation using the two-clock electronic device. For example, a control curve can be stored that indicates a maximum estimated clock-error of 1 ppm and initiates the correction of a clock frequency by, e.g., updating a register with +10 bits, for example, or adapting an analog drive voltage by +0.1V. Furthermore, the data storage may store data required for running the computer routines for calculating the estimation of the clock-error; such as data defining a measurement time period by its starting time point and its ending time point, data defining the length of the measurement time period, e.g., by common multiple time period(s), one of the common multiple time period ending at the ending time point, a length in time of common multiple time period, e.g., by the respective multiples of the nominal slave period and the master period. Furthermore, the data storage may store data defining a sequence of storing time points temporally displaced within the last common multiple time period of the measurement time period by the actual slave period, the last of the storing time points being the ending time point of the measurement time period. During the computer routines, the data storage may save count values of the master clock and the slave clock as well as sum values, error estimations etc.

With respect to a UWB location system implementation (as an exemplary application of the described two-clock electronic device 1), FIG. 1 shows a transmission and/or receiving device 17 in dashed lines. The transmission and/or receiving device 17 is configured to receive and/or send UWB signals via an antenna 19 from/to other components of the UWB location system. The transmission and/or receiving device 17 can receive clock signals 3A, 5A from the slave clock 3 or and/or the master clock 5. Furthermore, the transmission and/or receiving device 17 may exchange UWB timing signals S with the error estimation electronics 7.

The herein described concepts allow moving a wake-up time of the two-clock electronic device close to a required point in time. Thereby, the herein described concepts allow shortening the awake-time of the device and any device using the two-clock electronic device, thereby consequently saving energy for operating due to the elongated sleep time.

For example, assuming that a clock-error between the master clock 5 and the slave clock 3 is 10 ppm overtime, an overall error will increase with time to about 10 µs after 1 second, 100 µs after 10 seconds and so on. For ensuring proper wake-up, that error needs to be included correctly in the operation by waking up earlier, to not miss, e.g., an associated time slot within an UWB location frame of a UWB location system. Obviously, it is very important to know the clock-error as accurate as possible.

In UWB communication, the active time of 0.5 ms is significantly smaller than the usual sleep time period of, e.g., about 1 s. During the sleep time, the low frequency clock is operated only. However, for activating a tag device, a precise trigger for waking up is needed. As said, if the wake-up time is not correct due to a large clock-error, a longer active operation window needs to be applied to the tag device to ensure that during the required time the tag device is active.

Figure 2:
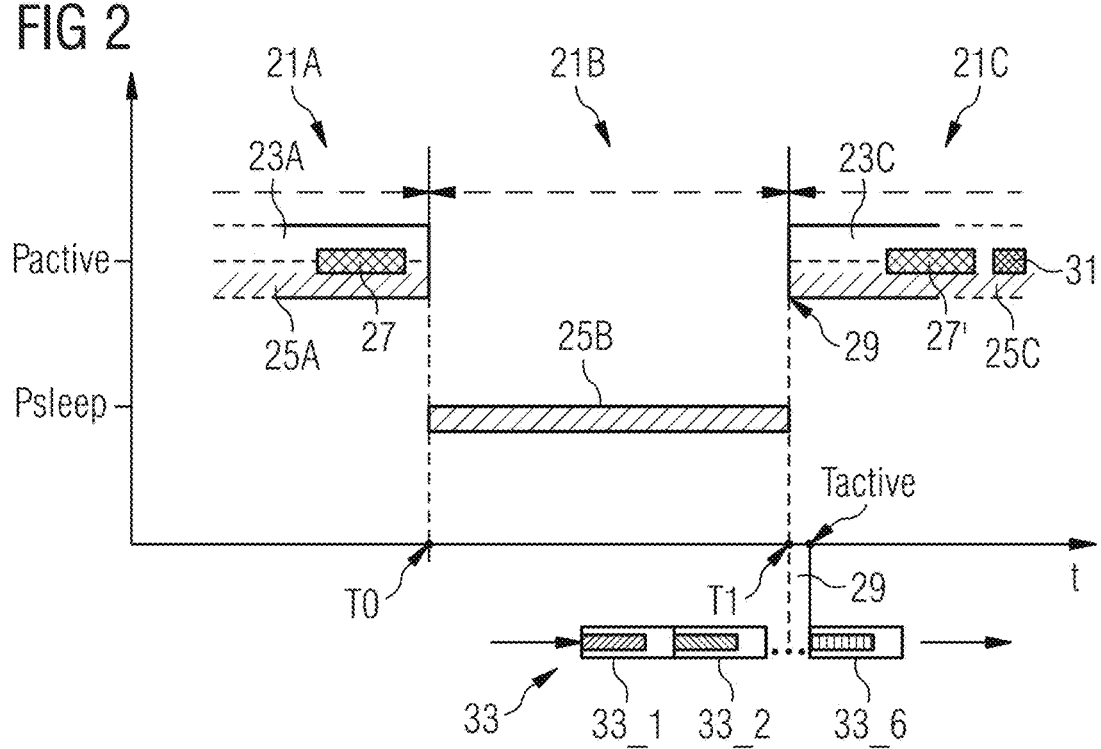
FIG. 2 shows a schematic illustration of power consumption when operating a two-clock electronic device.

Referring to FIG. 2, a time (t)-power (P)-diagram illustrates the timing aspects generally for a two-clock electronic device and further in connection with an exemplary UWB frame format. Schematically, if both clocks are operated and, thus, the application using the two-clock electronic device is in an active mode, more power is needed. This can be seen in the first portion 21A of the diagram illustrating the operation of the master clock (top part 23A) and the slave clock (dashed lower part 25A) at a high-power consumption rate Pactive. During that operational stage, the procedure described herein for deriving an estimation of a clock-error is performed. This is indicated by box 27 overlapping the top part 23A and the dashed lower part 25A.

Then at a time point T0, the master clock is switched off and only the slave clock is maintained over a time period that takes into consideration the determined clock-error when defining the length. This is indicated by only a dashed part 25B. During the time period (second portion 21B), a low-power consumption rate Psleep is given.

Thus, during time periods with the high-power consumption rate Pactive, both clocks 3, 5 are active and, for example, can be calibrated. The high-power consumption is due to the high current drawn by the master clock 5 being active as well as by the slave clock 3 being active. However, during time periods with the low-power consumption rate Psleep, only the slave clock 3 is active, while the master clock is sleeping (not active). The low-power consumption is due to the low current drawn by the slave clock 3, being the only power consuming clock.

At a time point T1, which is determined using the slave clock, the two-clock electronic device is woken up to resume operation e.g., activating the master clock and performing required activities itself or initiating that respective activities performed by the application using the two-clock electronic device. A top part 23C and a dashed lower part 25C show again the high-power consumption rate Pactive during the third portion 21C of the diagram.

Referring to the timing, the time point T1 is set to provide for a wake-up window 29 that extends until a time point Tactive, starting at which full operation is available. For example, a few microseconds e.g., 200 microseconds, may be required to ensure proper operation of the electronic elements, e.g., the transmission and/or receiving device 17 in FIG. 1, such that signal detection and/or signal transmission can be performed by the tag device properly. This is ensured by the wake-up window 29 (extending between the time points T1 to Tactive).

As a further indicated in FIG. 2, during the third portion 21C at further estimation of the clock-error can be performed (box 27') if needed. In addition, an adjustment 31 of the frequency of the slave clock 3 can be done based on the derived estimated error by moving the frequency of the slave clock 3 up or down depending on the determined error. Similarly, in principle, the master clock 5 could be adapted in frequency based on the determined error.

At the lower part of FIG. 2, a portion 33 of UWB frame is indicated schematically. As it is disclosed, for example, in the above mentioned PCT patent applications of the applicant, a UWB frame may include a sequence of time slots 33_1, 33_2, ... 33_6 associated specifically to various devices of the UWB location system. For a tag device being operated along the time-power-diagram of FIG. 2, an active time period may be in the range of 0.5 ms (such 0.3 ms to 5 ms or more such as 20 ms) for sending and receiving UWB signals. This active time period is significantly smaller than the sleep-time of the tag device, which is in the range from one second to several seconds or more. In view of the long sleep-time and accordingly the accumulation of the clock-error, a precise trigger is needed to ensure that the tag device wakes up briefly before the active time period. Specifically, the tag device needs to be activated shortly before the tag time slots within the UWB frame begins. In the example of FIG. 2, a tag device only needs to be active during the time period given by the time slot 33_6 to perform sending and/or receiving actions. During the time period given by the time slots 33_1 to 33_2 ... that tag does not need to be active (thus can be sleeping).

Others tags may be active during those time period given by those time slots falling between the time points T0 and T1.

As can be seen from the exemplary application of UWB localization, the determination of a clock-error may need to be completed within a very short time period at high accuracy (for the high accuracy, the master clock needs to be active). In the UWB example, the estimation of the error should be completed within the active time required for reception and/or transmission at a tag device, e.g., within a time slot in the range of a few ms (for example around 15 ms). This can be achieved based on the herein disclosed concepts, while prior art systems may require for providing the same size of clock-error an active time duration of several seconds.

Figure 3:
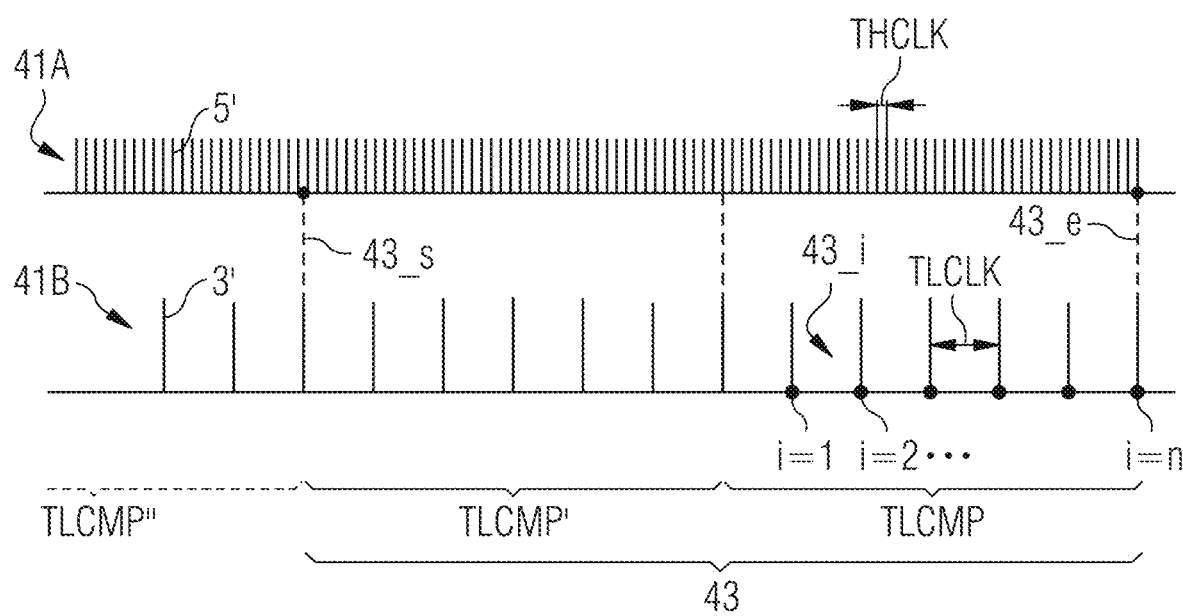
FIG. 3 shows rows of clock signals associated with the two-clock electronic device for illustrating parameters related to the clock-error estimation.

In connection with FIG. 3, it is explained how one can derive an estimation of a clock-error for a (slave) clock having an error with respect to a preset assumed frequency (set nominal frequency) using another (master) clock. Specifically, a measurement of master clock counts is compared to a respective value of counts that one would derive for ideally synchronized clocks, i.e., having no clock drift with respect to the set frequency.

In summary, the invention relates to counting clock signals within a specific measurement time period and according to a specific counting procedure. It is generally known to the skilled person how to count clock signals, e.g., based on the raising and/or falling edges of the signal. For example, the counter in a semiconductor device can be triggered at every period of the clock, on every rising edge and/or failing edge of each clock signal, or an integer multiple of the amount of HCLK and LCLK. E.g., one can count the amount of HCLK for one LCLK period, or several periods of LCLK. Further, one can count the amount of HCLK and LCLK every second period, every third period of their own clocks, etc.

For a raising edge or failing edge trigger, the steps sizes are THCLK and TLCLK.

For a raising and failing edge trigger, the steps sizes are THCLK/2 and TLCLK/2. Moreover, it is known to the skilled person how to handle digitalization affects such as rounding up or rounding down considerations. Thus, it is known to skilled person how, after triggering a starting point of a counting phase, the specific number of counts received from the starting point on can be made available within the counting and control box 7A.

To illustrate an exemplary measurement time period 43, FIG. 3 illustrates the clock signal chains 41A, 41B received by the counter and control box 7A from the master clock 5 (top row) and the slave clock 3 (bottom row). FIG. 3 refers to a TLCMP-procedure that is used for synchronizing the master clock 5 and the slave clock 3 based on the lowest common multiple period "TLCMP" or even a "sub common multiple period". Specifically, it relates to the "last TLCMP" of a time period at the end of which the estimation of the clock-error for the synchronization is achieved.

Regarding the "lowest common multiple", for any pair of frequencies, a period can be determined during which m counts of the master clock and n counts of the slave clock are measured. This period is shown in FIG. 3 as a time period TLCMP. In other words, the TLCMP period is defined as m periods THCLK of the master clock and at the same time as n periods TLCLK of the slave clock (m×THCLK=n× TLCLK).

At least one time period TLCMP should be considered. Additional preceding time periods TLCMP', TLCMP'' are indicated in FIG. 3. During those preceding time periods, the clock signal may be counted and used for the estimation of the clock-error. In FIG. 3, the measurement time period 43 includes exemplarily the preceding time period TLCMP' and the last TLCMP period. In another example, one may use the preceding time periods TLCMP' and TLCMP''' and the last TLCMP period.

The clock-error estimation can be based on two counting phases performed by the "counter block": phase a) "standard counting" (preferably until the last TLCMP period), and phase b) a specific counting procedure during the last portion of the measurement period, preferably the last TLCMP period. Phase a) is optionally. Adding standard counting phase a) can improve the reduction of the maximum clock-error.

It is noted that several TLCMP periods form a common multiple period (CMP) of the clock periods TLCLK and THCLK. Thus, the measurement time period can generally by a common multiple time period that includes at least one or a sequence of lowest common multiple time periods and a sequence of storing time points is defined in the last of the plurality of lowest common multiple time periods. In some embodiments, the measurement time period may include a plurality of common multiple time periods and the sequence of storing time points may be defined in the last of the plurality of common multiple time periods.

In general, the TLCMP period or a few TLCMP periods are preferred for keeping the measurement short. However, in principle also common multiple period periods can be used within phase b) and similarly preceded by respective phase b) CMP periods, TLCMP periods being, however, the (preferred) shortest measurement periods.

For a 32 kHz clock and 26 MHz clock, for example, while an estimated (maximum) clock-error of 0.9 ns may be derived during one TLCMP period (no phase a), i.e., no preceding standard counting), a maximum clock-error of 0.28 ns for preceding standard counting during one TLCMP period as phase a) was estimated (compared to standard counting error of 38.5 ns for a ~15 ms measurement time period related to an exemplary value of TLCMP=7.8125 ms=>2×TLCMP=15.625 ms for a measurement over two TLCMP periods).

The invention is based on a specific way of counting within the last TLCMP-period (TCMP-period). Specifically, the sum is done over low clock counts/signals. In other words, the counting procedure is based on storing for each clock signal in the last TLCMP/TCMP-period (also referred to as slave clock count or storing time point). For the last time period TLCMP in FIG. 3, the storing time points are indicated with i=1, i=2, . . . i=n. At these storing time points, the count value for the signal chain 41A of the master clock is identified and usually stored. The counter of the master clock is not stopped such that the count value increases from slave clock count to slave clock count. As for every slave clock count within the time period TLCMP a count value is stored, n values will be available for later analysis.

The beginning of the counting is the measurement time period, in FIG. 3 the beginning of the time period TLCMP'. Without phase a) it would be the beginning of the time period TLCMP.

Table 51 in FIG. 4 illustrates exemplary values for a 26 MHz master clock and a 32,768 kHz slave clock. In that case, a TLCMP period spans over 256 TLCLK_n periods and similarly 203125 THCLK periods. Assuming a measurement window as in FIG. 3, 256 storing time points correspond to the slave clock counts i=257 to 512.

It is noted already at this stage that instead of all slave clock counts, a sub-group such as fractions or random selections of slave counts may be used for the clock-error analysis, e.g., depending on the required accuracy and available computational power. In some embodiments, every other (even or odd) slave clock count (i=1, 3, 5, . . . or 2, 4, 6, . . . ) may trigger storing a count value of the clock signals of the master clock, or every third, fourth and so on slave clock count may be storing triggers. In these cases, equidistant clock counts would be considered to identify the storing time points. Alternatively, a random selection of the slave clock counts may be used, i.e., selecting slave clock counts randomly. In this case, non-equidistant slave clock counts are considered.

In other words, master count values may be stored for each of the storing time points or a sub-group of the storing time points, wherein the sub-group may include storing time points separated by multiple slave periods, a portion of consecutive storing time points, or randomly selected storing time points.

The stored master count value may correspond to the counted master signals up to the storing time point and may optionally include the master signal following the storing time point, i.e., be increase by one. Adding the stored master count values may include adding or subtracting half a count for each of the stored master count values.

It is further noted with respect to UWB applications that the time duration of one TLCMP period may be about several microseconds and, accordingly, may be comparable to the time needed for sending and/or receiving UWB signals within the UWB frame, e.g., correspond in time to a slot associated with the respective device at which the clock-error estimate is performed.

As a starting point for the comparison with the inventive approach, standard counting is illustrated for a 26 MHz master clock during two (in FIG. 3 e.g.: the TLCMP' and TLCMP periods) TLCMP periods (i.e., over 15.625 ms for a 32 kHz slave clock) results in a maximal clock-error of 2.46 ppm as the error is maximally one period of the master clock for standard counting. Now, during a sleep-mode when only the 32 kHz clock is running, one can estimate the worst-case error based on the 32 kHz clock as the high-frequency clock is usually more stable. Thus, standard counting results in a worst-case error of 2.46 µs after 1 s sleep mode, 24.6 µs after 10 s sleep mode etc.

In line with the herein proposed concepts, the following actions/calculations can be performed, for example, in the counter and control block 7A, and optionally in the fast and fine tuning block 7. The actions/calculations are based on the counts triggered by the clock signals received at the counters 9A, 9B.

For any set clock frequencies of the master clock and the slave clock, one can find a lowest common multiple period associated with each oscillator: $n \times TLCLK = m \times THLCK = TLCMP$ For the above mentioned 32 kHz and 26 MHz oscillators (T32 kHz=1/32768 and T26 MHz=1/26000000):

$$256 \times T32 \text{ kHz} = 203125 \times T26 \text{ MHz} = 7.8125 \text{ ms}$$

Referring to the above mentioned counting phases a) and b), one can consider one TLCMP period or several periods of TLCMP (R×TLCMP) to form the measurement time period (valid for R=1 to any integer number).

Referring to the TLCMP period, the proposed counting approach is as follows:

UNTIL: (R−1) period of TLCMP+1×TLCLK, the standard counting is used, i.e., every clock count is counted until the first count of the slave clock in the last TLCMP period.

Table 51 of FIG. 4 lists for i=257 a master count value of "203916.5" for 9 ppm detuned slave clock, wherein the last count before the storing time point 257 was increase by "0.5". For the slower ticking ideal clock, a nominal clock count value of "203918.457" is indicated as well.

Beginning at (R−1) period of TLCMP+1×TLCLK, the data value of the counter for the master clock is stored (slave clock count i=1). The master counter is not stopped and continues counting for the slave periods within the TLCMP period. As a result, one can measure (store) for the end of each period of the slave clock, i.e., at the ith-storing time points, the master count values. Exemplary master count values (measured for detuned slave clock and calculated for ideal slave clock) for i=258, 259 and 512 are given in Table 1 of FIG. 4.

The stored master count values are added up, in other words all data values stored are accumulated as one forms a sum over n stored data values, i.e., stored from (R−1)× TLCMP+1×TLCLK to (R−1)×TLCMP+n×TLCLK (=R× TLCMP).

In the example of R=2, the measured values relate to the counts from 257 to 512 of the slave clock within the measurement period.

The accumulation results in a measured actual master count sum value that is the sum over all measured (master) count sum values, each including the counts from the beginning of the measurement period until the respective slave clock count; i.e., the master count values are accumulated for the considered slave clock counts, e.g., i=1 to n if all slave clock counts are used as storing time points; those master count values were stored at the storing time points, e.g., in the data storage 13. As mentioned above, a roundup or down of counts can be applied, if one includes the next master count or stops at the preceding master count for the master count measurement (of the master clock) once for a slave clock count, e.g., an edge of the slave clock signal is detected.

The measured actual master count sum value is compared to a respective sum for a slave clock without a clock-error ("ideal slave clock"). For example, the measured actual master count sum value can be divided by a nominal master count sum value. The nominal master count sum value is given as:

Sum over the respective "ideal" slave counts (e.g., over i=1 to n if all slave counts were used as storing data points) of the master counts counted from the beginning of a "measurement" period up to the respective ideal slave clock count, e.g., up to the ith TLCLK_n-count within the last TLCMP period, i.e., until (R−1)×TLCMP+ith TLCLK_n. Thus, the nominal master count sum value can be derived based on the equation:

sum of $[(R-1) \times m + i \times TLCLK\_n/THCLK]$ over i, whereby R is the number of common multiple time period(s) within the measurement time period, m is the number of master clock counts defining the common multiple time period, i is the number of counted ideal slave periods within the last common multiple time period, TLCLK_n is the nominal slave period of the slave clock, and THCLK is the clock period of the master clock. The sum is performed over e.g., i=1 to n, with i being the number of counted ideal slave periods within the last common multiple time period; "i" goes, for example, from 1 to n if all slave periods are involved in the clock-error estimation.

The nominal master count sum value can be a value stored the data storage 13 or be based on/derived from values stored on and accordingly read from the data storage 13.

In this context "ideal" slave counts refer to a theoretical value, valid for exact clocks, e.g., operated at 32768 Hz and 26 MHz, respectively with n=256 and m=203125. In that example, the sum above would involve the term TLCK/THCLK=203125/256.

In this manner, maximally n count values at storing time points, which correspond to the slave clock intervals during the last TLCMP period, can be determined for the master clock and the assumed ideal clock. Based on the comparison of the count sum values, a better accuracy of the slave clock-error estimation versus the master clock can be achieved, as the error is evenly spread during this last TLCMP period. Thus, the digitalization error can be reduced.

Similar calculations can be set up if not the least common multiple is used but a common multiple. Then, the respective values m' for m and n' for n need to be used, with m'×THCLK=CMP=n'×TLCLK_n, where CMP is the used common multiple period.

In Table 53 of FIG. 4, two sums are indicated as actual master count sum value of "78100861" for the measurement time period and nominal master count sum value of "78101562.5" for the ideal clock. Based on these sum values, a ratio was calculated to be 0.999991012 corresponding to an estimation value of a (maximum) clock-error of 8.98828 ppm; i.e., being erroneous for the assumed clock-error of 9 ppm by −0.01162 ppm and representing an improvement of about 212 in comparison to standard counting over the same measurement time period.

When simulating a clock-error of 9 ppm for the above mentioned 32 kHz (slave) clock, the following situations were tested and showed the improvement of the estimation of the clock-error. As an example, at the storing time points (the 32 kHz count events), the counting was stopped right away (DOWN measurement; optionally half a master count was added, i.e., +0.5×THCLK) or the next clock signal of the master clock was included (UP measurement; optionally half a master count was subtracted). In a further simulated measurement, the accumulation neglected the first count (i.e., used n−1 values). In further simulated measurements, only every other slave clock signal or every third slave clock signal as storing time point were used for the accumulation.

For further comparison, the improvements for an error of 32 kHz slave clock between 0 to 100 ppm, by steps of 0.1 ppm were analyzed with respect to an average error:
- average error of 0.191 ns for 256 storing time points, i.e., accumulation during the complete TLCMP period (improvement of nearly 201 times better than for the standard calibration method);
- average error of 0.196 ns with 255 storing time points, i.e., accumulation during TLCMP period reduced by one TLCLK period (improvement of nearly 197 times better than for the standard calibration method);
- average error of 0.216 ns with 256 storing time points (DOWN measurement), counts increased by 0.5 THCLK (improvement of ~178 times better than for the standard calibration method);
- average error of 0.217 ns with 256 storing time points (UP measurement), counts decreased by 0.5 THCLK (improvement of ~177 times better than for the standard calibration method).

Summarizing, the herein proposed concepts allowed improving the estimation accuracy of the slave clock versus the master clock, by around 200 times within two TLCMP periods.

When looking at only one TLCMP period (R=1) as the measurement time period, the estimation accuracy improved around 88 times. For R=3, the estimation accuracy improved around 220 times. For R=4, the estimation accuracy improved around 227 times. For R=8, the estimation accuracy improved around 255 times. Summarizing, the estimation for a clock-error with R>1 can achieve improvements in average higher than 200 times of the THCLK period (~0.19 ns).

Looking at a measurement time period of two TLCMP periods (R=2), for assumed clock-errors in the range from 0 to 100 ppm, there were about 50% of the estimated clock-errors, which were lower than 0.1 ns error, and only 25% of the estimated clock-errors were above 0.19 ns (the mentioned average value).

Figure 5:
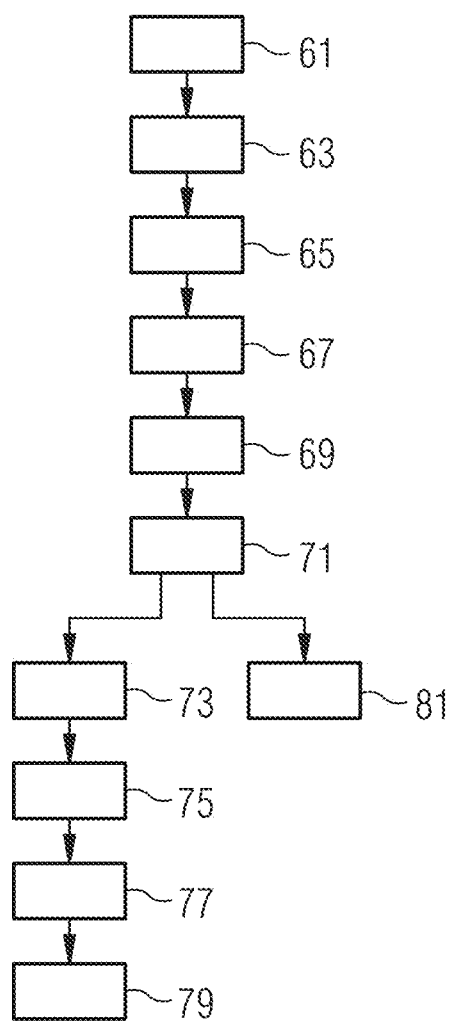
FIG. 5 shows a flowchart illustrating a first method for deriving an estimation of a clock-error for slave clock.

FIG. 5 shows a flowchart illustrating a procedure for deriving an estimation value of a clock-error for a slave clock (with further reference to FIG. 3) In a step 61, the master clock and the slave clock are operated to output sequences of master clock signal and a slave clock signals at a master period and an actual slave period, respectively. In a step 63, a measurement time period 43 is set (provided) that begins at a starting time point 43_S and ends at an ending time point 43_e, wherein the measurement time period includes a common multiple time period (TLCMP), the common multiple time period (TLCMP) ending at the ending time point 43_e and having a length in time, which is a first multiple (n-times) of the nominal slave period and is a second multiple (m-times) of the master period. Furthermore, in a step 65, a sequence of storing time points 43_i is defined (provided). The storing time points 43_i are temporally displaced within the common multiple time period and are given by the slave clock signals within the common multiple time period (TLCMP). The last possible storing time point can thus be the ending time point 43_e of the measurement time period 43.

In step 67, one starts to count the slave signals 3' and the master signals 5' at the starting time point and stores in step 69 for more than one storing time point, a master count value of the counted master signals in association with the slave count value corresponding to the respective storing time point.

In step 69, an actual master count sum value is generated by adding the stored master count values.

In step 69, for the more than one storing time points, a nominal master count sum value is generated, and, in step 71, by relating the actual master count value to the nominal count value, the estimation value of the clock-error for the slave clock is derived. Deriving the estimation of the clock-error may include subtracting the value 1 from the ratio between the nominal master count sum value and the actual master count sum value.

The method summarized in steps 61 to 71 may be applied to various applications using two-clock electronic systems as, for example, a method for operating a location system that includes at least one two-clock device with a slave clock and a master clock. The two-clock device can be operated in a location mode for supporting localization and a sleep mode during which localization is not supported and an operation of the slave clock is maintained. Then, a method for reactivating the two-clock device when operating a location system can include steps 61-71 for deriving an estimation of a clock-error for the slave clock of the two-clock device using the above explained method, while the two-clock device is operated in the location mode. Then, a required duration of the sleep mode to be monitored by the slave clock is determined under consideration of the estimation of the clock-error (step 73). In step 75, the sleep mode of the two-clock device is activated. In step 77, a slave clock signal of the slave clock is monitored (i.e., the slave clock counts defining the determined duration of the sleep mode are counted) to identify an expiration of the required duration of the sleep mode. Finally, the two-clock device is reactivated (step 79), once the expiration of the required duration of the sleep mode is detected. In some embodiments of the method for reactivating the two-clock device, the two-clock device may be a component of a mobile tag device that is associated with a time slot within a location frame format underlying the location system. Then, a wake-up time of the tag device may be based on the estimation of the clock-error that is derived for the slave clock of the tag device.

In addition or alternatively, the method summarized in steps 61 to 71 may be the bases for calibrating a clock of a pair of clocks of a two-clock device. For example, a method for calibrating a slave clock with respect to a master clock can include steps 61-71 for deriving an estimation of a clock-error for the slave clock of the two-clock device using the above explained method. In a step 81, the slave clock or the master clock may be set based on the estimation of the clock-error, in particular tuned towards the actual slave period TLCLK_n.

Figure 6:
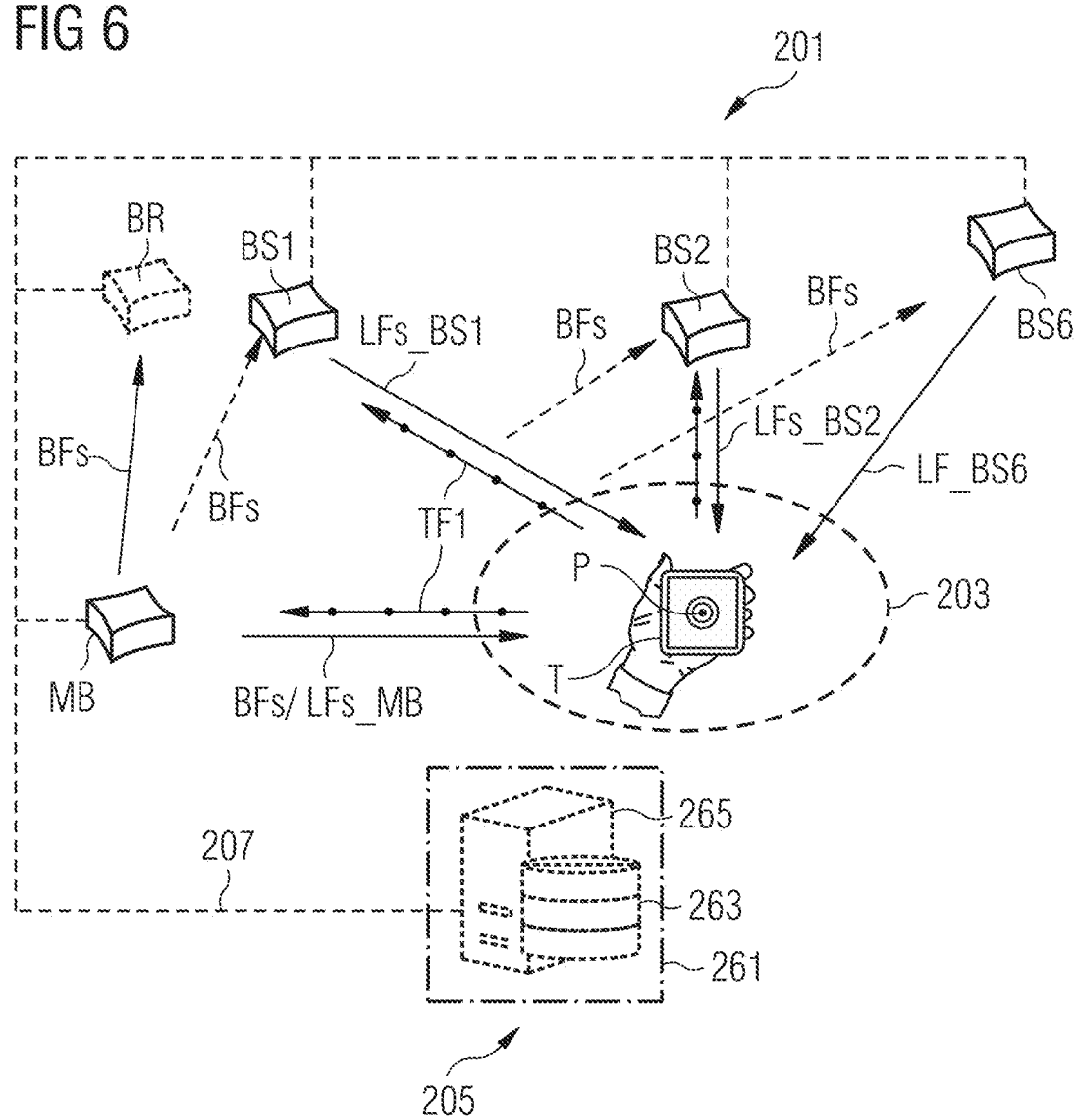
FIG. 6 shows a schematic illustration of a location system that includes a master beacon device, a mobile tag device, several tag response receptors, and a beacon repeater device.

Referring to FIG. 6, various components of an (ultra-wideband indoor real-time) location system 201 are shown schematically such as a master beacon device MB, an (exemplary hand held) mobile tag device T, several beacon satellite devices BS1, BS2, BS6, and exemplarily a beacon repeater device BR.

With respect to an exemplary embodiment of UWB signal transmitters, it is referred to the sections "Master beacon device" of the above-mentioned international patent applications, which are specifically incorporated by reference herein. With respect to an exemplary embodiment of the mobile tag device, it is referred to the sections "(Mobile) tag devices" of the above-mentioned international patent application, which are specifically incorporated by reference herein (see e.g., sections "Reception units" and "Calibration and calculation units").

Specifically, a tag device is a unit that is to be located within a location area of the location system. Preferably the tag device is a mobile unit, which means that it is not permanently at the same place, which makes it interesting to localize the tag device. It may be moved by being attached to or being part of a moving object. The mobile tag device receives UWB signals from a plurality of UWB signal transmitters. The tag device may include a (beacon/signal) reception unit, a two-clock electronic device including a slave clock and master clock as a tag clock, and a (optionally calibration and) calculation unit including a time detection unit, an identification unit, and a control unit. The tag clock may be realized as a clock-pulse-generator or a clock-wave-generator. The tag clock defines a tag time for each tag. As for the master beacon device, some or all of these elements, in particular the two-clock electronic device may be part of a UWB chip. The tag device can receive UWB pulses, specifically the master (or repeater) beacon frames, with the signal reception unit. The signal reception unit may comprise a reception (Rx) antenna. The tag device may further send UWB pulses to be received from other components of the UWB location system. A tag may be placed in a housing, which may also encompass other functionalities such as a smartphone, a computer, a control system of an automated guided vehicle etc., for example.

For the TDoA analysis, the location system has information on the positions of the master beacon device, and the beacon satellite device(s).

In an exemplary embodiment, the beacon satellite devices BS1, BS2, BS6 and the beacon repeater device BR may each include a receptor unit, thereby having also the functionality of being synchronizable with the master beacon device MB. It is noted that usually a master beacon device MB or a beacon repeater device BR can be installed within a room or hall, generally a localizing sub-region covered by the location system 201, to ensure temporal synchronization of the transmitted UWB signals.

The tag device T may be configured to determine its positions within space, specifically within a location area 203 from the received UWB signals. In the present field of localizing, real time means that position information is available fast enough compared to the speed of movement of a tag device such that the movement can temporally be resolved to a sufficient degree. The location area 203 is defined by the coverage of the UWB signal exchange between the various components.

In the exemplary embodiment of FIG. 6, the location system 201 further includes a (system) control unit 205 that is connected for data exchange with the master beacon device MB and beacon satellite devices BS1, BS2, BS6, and the beacon repeater device BR. The data connections may be based on cables 207 or may be wireless. Thus, the components may be part of a LAN and/or WLAN network or other communication network(s). The control unit 205 may include a centralized computer system 261 (exemplarily shown in FIG. 1A) or a decentralized computer system with a data storage unit 263 and a calculation unit 265. The data storage unit 263 may store, e.g., the master time delay data mentioned below and the slot information of the satellite devices, e.g., for clock synchronization.

In addition, the UWB signal transmission is schematically illustrated in FIG. 6. The master beacon device MB and the beacon satellite devices BS1, BS2, BS6 transmit beacon frames BFs/LFs_MB, LFs_LBS1, LFs_LBS2, . . . LF_BS6 that can be received by the tag device T within the location area 203. The tag device T processes the UWB signals for localization. In addition, beacon satellite devices BS1, BS2, BS6 may also receive and process the UWB signals of the master beacon device MB (indicated as beacon frames BFs) for clock calibration (see the above-mentioned international patent application PCT/IB2019/000745 for an exemplary calibration approach).

The master beacon device MB and beacon satellite devices BS1, BS2, BS6 may further receive beacon frames TF1 emitted from the tag for non-tag centric approaches. For example, the tag devices T may emit tag response frames with a tag specific time delay in line with the location protocol. The master beacon device MB and beacon satellite devices BS1, BS2, BS6 may act as tag response receptors and will receive the tag response frame TF1 and derive a specific time of arrival (ToA) for the tag device T for the tag response frame TF1. In combination with the emission time of the beacon frames BFs from the master beacon device MB or a beacon repeater device BR, a time difference-of-arrival analysis A_TDoA can be performed by the respective tag response receptor TRR.

Furthermore, FIG. 6 indicates a concept of using the beacon repeater device BR to extend the range of the location system 201 (in particular the synchronization) e.g., over several rooms. For that purpose, the beacon repeater device BR emits repeater beacon frames that cover an associated area, usually at least one room, in which it may function as a master beacon device, e.g., for calibration.

In the case that a tag device is configured to have sufficient computing power required for performing analysis and calculation of reception time points of master and repeater frames (and provided that the tag device knows the exact location of each beacon transmitter such as the master beacon and the repeater beacons), the tag device—when receiving beacon frames sent at time slots of a predefined beacon section of the location frame format—may determine distance information for the distances between the tag device to the master beacon device and the plurality of beacon satellite devices based on position information of the master beacon device and the plurality of beacon satellite devices. Specifically, based on a plurality of time points of arrival, a time difference-of-arrival analysis can be performed within the mobile tag device. Alternatively, the localizing may be performed by the control unit 205.

An exemplary stationary anchor such as a master beacon device MB or a beacon satellite device BS1, . . . in FIG. 6 may comprises a housing with, e.g., several through holes for fastening screws to attach the anchor stationary to a wall or ceiling at a spatially fixed position in 3D-space. Within the housing, the anchor may include a beacon transmission unit that is configured to perform transmission of localizing beacon frames LFs_MB, LFs_BS1 . . . and/or a UWB transceiver unit. The anchor may further include a master (satellite) clock defining a master (satellite) time. In the latter case, the anchor may further include a master (satellite) storage unit and optionally a calibration and calculation unit including the herein disclosed two-clock electronic device. Some or all of the above components may be integrated at least partly within a common UWB chip and/or may be mounted to a base plate or substrate.

An exemplary tag device may comprise a housing with a display and an opening, for example, for attaching to some to be located object. Alternatively, the tag device may be integrated in some device such as a self-moving object. The tag device may include two-clock electronic device with a master clock as a tag clock defining a tag time that is specific for the respective tag device. The tag device may further include a tag data storage unit.

The tag device may further include a UWB reception and/or a UWB transceiver unit and an (optionally calibration and) calculation unit. The reception unit is configured as a UWB frame receiver to receive the beacon frames sent from the master beacon device or a beacon satellite device, thereby measuring respective time points of arrival. The calculation unit may include a time detection unit configured to derive respective arrival time points for the received UWB signals, an identification unit configured to derive the unique information content from the received UWB signals, and optionally a control unit configured to process the unique information content and the arrival time points for at least a subset of UWB signal transmitters in a localizing algorithm to derive the position of the mobile tag device with respect to the subset of the UWB signal transmitters. The above components of a tag device may be integrated at least partly within a common UWB chip and/or may be mounted to a base plate or substrate.

While in UWB systems, the master MB does not turn off his master clock, it could do it if needed (e.g., for current consumption purpose). Usually, the master MB does not perform a clock synchronization of his master clock, while the master MB could synchronize its slave clock. In contrast, the remaining devices (tag devices or repeater devices) may turn off or not the master clock. The devices, however, may perform on a regular basis (not always, because is consume power) master clock synchronization, and as well slave clock synchronization.

Referring to the UWB system briefly discussed in connection with FIG. 6 and to the exemplary UWB systems disclosed in the above-mentioned PCT patent applications of the applicant, TLCMP-periods of about 8 ms may be given. Considering the wake-up time periods of several 10 μs, an error estimation and optionally a clock calibration may be performable during that length of wake-up time periods.

The proposed TLCMP-procedure can be/is operated at the stationary units (master or slave) and at the tags (the new drawings indicate "Master" and "Slave")

Referring further to FIG. 6 and the above-mentioned PCT applications of the applicant on UWB location systems, a master clock of a tag device can be used to calibrate the slave clock of the tag device, while the master clock of the tag device may be synchronized using UWB pulse exchange with a master device.

It is noted with respect to using the estimated clock-error for calibration that a correction of a clock is decided within the application, i.e., if the application prefers performing the correction right after this computation error, or doing first a specific operation under consideration of the estimated error (such as UWB ranging and considering the estimated clock-error during two way ranging computation, for example). One can then decide whether the clock should be updated after the next wake up and a new clock-error estimation should be based on that setting.

Although the preferred embodiments of this invention have been described herein, improvements and modifications may be incorporated without departing from the scope of the following claims.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   setting a slave clock to a nominal slave period;
   receiving, from a master clock, a sequence of master clock signals at a master period;
   receiving, from the slave clock, a sequence of slave clock signals at an actual slave period;
   providing a measurement time period that begins at a starting time point and ends at an ending time point, the measurement time period including a common multiple time period, the common multiple time period ending at the ending time point and having a length in time that is a first multiple of the nominal slave period, and is a second multiple of the master period;
   providing a sequence of storing time points temporally displaced within the common multiple time period by the actual slave period, a last of the storing time points being the ending time point of the measurement time period;
   starting to count the slave clock signals and the master clock signals at the starting time point;
   for more than one storing time point, storing a master count value that represents the counted master clock signals in association with the respective storing time point;
   adding the stored master count values to generate an actual master count sum value;
   deriving, for the more than one storing time points, a nominal master count sum value; and
   deriving an estimation of a clock-error for the slave clock by relating the actual master count sum value to the nominal master count sum value, the estimation of the clock-error approximating a difference between the actual slave period and the nominal slave period.

2. The method of claim 1, wherein the common multiple time period includes a sequence of lowest common multiple time periods, and the sequence of storing time points is defined in a last of the lowest common multiple time periods.

3. The method of claim 1, wherein the measurement time period includes a plurality of common multiple time periods, and the sequence of storing time points is defined in a last of the common multiple time periods.

4. The method of claim 1, wherein the master count values are stored for each of the storing time points or a sub-group of the storing time points, the sub-group including storing time points separated by multiple slave periods, a portion of consecutive storing time points, or randomly selected storing time points.

5. The method of claim 1, wherein each of the stored master count values corresponds to the master clock signals counted up to the respective storing time point, and includes the master clock signal following the storing time point.

6. The method of claim 1, wherein adding the stored master count values includes adding or subtracting half a count for each of the stored master count values.

7. The method of claim 1, wherein deriving the estimation of the clock-error includes subtracting a value 1 from a ratio between a nominal master count value and an actual master count value.

8. The method of claim 1, wherein each stored master count value is generated to include the counts for the master clock from a beginning of the measurement time period until a respective slave clock count of a storing time point associated with the stored master count value.

9. The method of claim 1, wherein:
the nominal master count sum value is derived based on the equation, and/or based on values derived by the equation: sum of $[(R-1) \times m + i \times TLCLK\_n/THCLK]$, where R is a number of common multiple time period (s) within the measurement time period, m is a number of master clock counts defining the common multiple time period, i is a number of counted ideal slave periods within a last common multiple time period, $TLCLK\_n$ is the nominal slave period of the slave clock, and THCLK is a clock period of the master clock; and
the values and/or the nominal master count sum value are read from a data storage.

10. The method of claim 1, wherein a number of storing time points used for storing master counts values is selectable based on a required maximal clock-error and/or an available calculation power.

11. The method of claim 1, further comprising:
calibrating the slave clock with respect to the master clock by tuning the slave clock towards the actual slave period based on the estimation of the clock-error.

12. A method comprising:
operating a location system that uses a two-clock device, the two-clock device including a slave clock and a master clock, the two-clock device being operable in a location mode for supporting localization, and in a sleep mode during which localization is not supported and an operation of the slave clock is maintained;
operating the two-clock device in the location mode;
setting the slave clock to a nominal slave period;
receiving, from the master clock, a sequence of master clock signals at a master period;
receiving, from the slave clock, a sequence of slave clock signals at an actual slave period;
providing a measurement time period that begins at a starting time point and ends at an ending time point, the measurement time period including a common multiple time period, the common multiple time period ending at the ending time point and having a length in time that is a first multiple of the nominal slave period, and is a second multiple of the master period;
providing a sequence of storing time points temporally displaced within the common multiple time period by the actual slave period, a last of the storing time points being the ending time point of the measurement time period;
starting to count the slave clock signals and the master clock signals at the starting time point;
for more than one storing time point, storing a master count value that represents the counted master clock signals in association with the respective storing time point;
adding the stored master count values to generate an actual master count sum value;
deriving, for the more than one storing time points, a nominal master count sum value;
deriving an estimation of a clock-error for the slave clock by relating the actual master count sum value to the nominal master count sum value, the estimation of the clock-error approximating a difference between the actual slave period and the nominal slave period;
determining a required duration of the sleep mode to be monitored by the slave clock in accordance with the estimation of the clock-error;
activating the sleep mode of the two-clock device;
monitoring the slave clock signal of the slave clock to identify an expiration of the required duration of the sleep mode; and
reactivating the two-clock device upon detecting the expiration of the required duration of the sleep mode.

13. The method of claim 12, wherein the two-clock device is a mobile tag device that is associated with a time slot within a location frame format underlying the location system, and the method further comprises:
basing a wake-up time of the tag device on the estimation of the clock-error that is derived for the slave clock of the tag device.

14. A two-clock device comprising:
a slave clock, wherein the slave clock is associated with a nominal slave period and is configured to output a sequence of slave clock signals at an actual slave period, and wherein a difference between the actual slave period and the nominal slave period is approximated by an estimation of a clock-error for the slave clock;
a master clock, wherein the master clock is configured to output a sequence of master clock signals at a master period; and
error estimation electronics configured to:
receive the sequence of master clock signals at the master period;
receive the sequence of slave clock signals at the actual slave period;
provide a measurement time period that begins at a starting time point and ends at an ending time point, the measurement time period including a common multiple time period, the common multiple time period ending at the ending time point and having a length in time that is a first multiple of the nominal slave period, and is a second multiple of the master period;
provide a sequence of storing time points temporally displaced within the common multiple time period by the actual slave period, a last of the storing time points being the ending time point of the measurement time period;
start counting the slave clock signals and the master clock signals at the starting time point;

for more than one storing time point, store a master count value that represents the counted master clock signals in association with the respective storing time point;

add the stored master count values to generate an actual master count sum value;

derive, for the more than one storing time points, a nominal master count sum value; and derive the estimation of the clock-error for the slave clock by relating the actual master count sum value to the nominal master count sum value.

15. The two-clock device of claim 14,
wherein the two-clock device is used in a location system, and the two-clock device is configured to operate in a location mode for supporting localization, and in a sleep mode during which localization is not supported and an operation of the slave clock is maintained; and
wherein the error estimation electronics are further configured to:

operate the two-clock device in the location mode;

determine a required duration of the sleep mode to be monitored by the slave clock in accordance with the estimation of the clock-error;

activate the sleep mode of the two-clock device;

monitor the slave clock signal of the slave clock to identify an expiration of the required duration of the sleep mode; and reactivate the two-clock device upon detecting the expiration of the required duration of the sleep mode.

16. The two-clock device of claim 14, wherein the error estimation electronics are further configured to calibrate the slave clock with respect to the master clock by tuning the slave clock towards the actual slave period based on the estimation of the clock-error.

17. The two-clock device of claim 14, wherein the error estimation electronics include a data storage having stored therein:

data defining the measurement time period;

data defining the sequence of storing time points; and/or data representing the nominal master count sum value derived by the equation, and/or values derived by the equation: sum of $[(R-1) \times m + i \times TLCLK\_n/THCLK]$, where R is a number of common multiple time period(s) within the measurement time period, m is a number of master clock counts defining the common multiple time period, i is a number of counted ideal slave periods within a last common multiple time period, $TLCLK\_n$ is the nominal slave period of the slave clock, and THCLK is a clock period of the master clock.

18. The two-clock device of claim 14, wherein the two-clock device further comprises:

ultra-wide band localizing electronics including signal receiving and emission electronics that are configured to be operated in line with a localizing frame that requires the localizing electronics to perform specific localizing actions during a wake-up period.

19. The two-clock device of claim 14, wherein:

the slave clock is a low-power-consuming, low-frequency clock; and the master clock is a high-precision, high-frequency clock.

20. The two-clock device of claim 14, further comprising a battery configured to provide power to the slave clock, the master clock, and the error estimation electronics.

* * * * *